United States Patent [19]

Takeda et al.

[11] 4,270,576

[45] Jun. 2, 1981

[54] SELF-CONTAINED FLUID JET-MIXING APPARATUS AND METHOD THEREFOR

[76] Inventors: Masahiro Takeda; Kenjiro Takeda, both of No. 16-14, 4-chome, Shimouma, Setagaya-ku, Tokyo, Japan, 13

[21] Appl. No.: 49,913

[22] Filed: Jun. 19, 1979

[30] Foreign Application Priority Data

Jun. 20, 1978 [JP] Japan .......................... 53/83671[U]

[51] Int. Cl.[3] .............................................. F16K 19/00

[52] U.S. Cl. .................................. 137/888; 239/405; 366/165; 366/337

[58] Field of Search ................ 137/604, 888; 239/405, 239/406; 366/163, 165, 178, 174, 336, 337, 338, 339; 406/153

[56] References Cited

U.S. PATENT DOCUMENTS

| | | | |
|---|---|---|---|
| 475,297 | 5/1892 | Coates | 239/405 X |
| 1,469,479 | 10/1923 | Kent | 239/405 |
| 1,493,795 | 5/1924 | Tyler | 239/406 |
| 2,802,648 | 8/1957 | Christensen | 366/178 X |
| 2,957,495 | 10/1960 | Ashbrook | 137/604 |
| 3,016,692 | 1/1962 | Iapella | 417/171 |
| 3,236,280 | 2/1966 | Greinke | 239/405 X |
| 3,643,927 | 2/1972 | Crouch | 366/337 |
| 3,861,652 | 1/1975 | Clark | 366/336 |
| 4,068,830 | 1/1978 | Gray | 366/174 |
| 4,098,582 | 7/1978 | Takeda | 55/456 X |

FOREIGN PATENT DOCUMENTS 1014077 8/1957 Fed. Rep. of Germany ........... 366/178

*Primary Examiner*—Robert G. Nilson
*Attorney, Agent, or Firm*—L. Lawton Rogers, III

[57] ABSTRACT

A fluid jet-mixing apparatus for use in a flow deflecting structure or passageway unit disposed intermediately between an inlet and an outlet of a fluid or fluids to and from an adjacent reacting area in the upstream or downstream thereof, which incorporates a guide vane assembly for allowing the fluid or fluids to pass therethrough under appropriate flow velocity and pressure conditions, the guide vane assembly comprising a cylindrical wall member defining the fluid passageway and a flow deflecting structure of a guide vane form disposed within the cylindrical wall member and composed of a plurality of generally semi-elliptic shaped panel members and a triangular-shaped partition member, and a suction or introduction pipe member incorporated concentrically in the center of the guide vane assembly and extending in communication with the outside of the passageway system so as to cause another fluid to be dynamically introduced or sucked from outside into the fluid passageway system, thereby to have the flowing fluid or fluids inside the passageway system mixed efficiently with the fluid introduced from the outside of the passageway system.

5 Claims, 4 Drawing Figures

SELF-CONTAINED FLUID JET-MIXING APPARATUS AND METHOD THEREFOR

BACKGROUND OF THE INVENTION

The present invention relates in general to an improvement of an apparatus for and method of attaining an improved effect of fluid mixing and contact between a plurality of fluids, and more particularly to an improved apparatus for and method of causing a fluid or fluids from the outside of a fluid passageway system to be introduced into the passageway system by way of a kinematical momentum or energy generated in a fluid or fluids (such as a gas, a liquid, a fluidized solid and/or a mixture thereof) passing through the fluid passageway system and having thus-introduced fluid or fluids efficiently mix and contact with the fluid or fluids flowing within the passageway system, whereby a part of a total of such a single or plural phases of operations as oxidation, reduction, mixing, polymerization or depolymerization of a high molecular compound, heat exchanging, ultrasonic wave generation, foaming, etc. can now be attained within a minimal period of time.

In the conventional art of having a fluid or fluids outside a fluid passageway system sucked or introduced by a negative pressure into the passageway system, there have been proposed such arrangement that there are provided appropriate means such as a tubular intake or suction conduit extending in communication with the outside of the passageway system and appropriate orifice or perforated means are incorporated in the tubular means, and the like. However, such means have turned out to be quite unsatisfactory in the requirement to attain a desired extent of induction of the fluid or fluids into the fluid passageway system, since it is inevitable with such arrangement that there is very likely to be a trace of ribbon-like stream of thus-introduced fluid in the longitudinal direction of the fluid passageway system at and around the central or axial area thereof. Under such condition of fluid introduction within the passageway system, it is apparent that there is expected only a poor efficiency of mixing or agitation in the introduction of such fluid from the outside of passageway system thereinto.

Besides, there have been many difficulties encountered in the mechanical or maintenance engineering standpoint due to its rather delicate structure. On the other hand, if and when provided further means of agitating the fluid within the fluid passageway system in an attempt to meet such drawback, there would occasionally be such that the fluid or fluids passing within the passageway system is forcibly discharged outwardly from the above mentioned point of introduction due to a drag effect of such agitating means, and therefore, it would be desired to have such passageway system equipped with another mixing aid in order to promote the effect of mixing or contact of the fluid involved in the system. With such conventional arrangement, it would be difficult to be assured of a high-efficient, yet a trouble-free fluid mixing and contact reaction after all.

SUMMARY OF THE INVENTION

It is therefore a primary object of the present invention to provide an improved and unique apparatus for and method of improving a mixing and contact action between fluids involved within a fluid passageway system free from any of such drawbacks as stated above as being inherent to the prior art.

It is another object of the present invention to provide an improved and useful apparatus for and method of improving a mixing and contact action between fluids, which are versatilely applicable to such chemical reactions as oxidation, reduction, absorption/adsorption, polymerization and depolymerization of a high molecular compound, and also to such physical actions as cooling, heat exchanging, wetting, aeration, ultrasonic wave generation, foaming, etc.

It is still another object of this invention to provide a unique and useful apparatus and method of improving a mixing and contact action between fluids involved in a fluid passageway system which is operable with a high follow-up capability under substantial fluid load fluctuations and can attain a good contact efficiency.

It is a further object of this invention to provide a high efficiency apparatus for and method of improving a mixing and contact action between fluids involved which is an extraordinarily simple in construction, can be applied with an extrally high fluid velocity, and thus can be made relatively small in size with respect to a volume of a fluid or fluids to be treated thereby.

It is a still further object of this invention to provide a unique and useful apparatus for and method of improving a mixing and contact action between fluids involved which is operable with an optimal balance between a flow drag, and a profile and frictional drag during contact action between fluids so as to minimize deposit of scales onto the components of such apparatus.

The foregoing object, characteristics, principle and details of the present invention, as well as further objects and advantages thereof, will become more apparent from the following detailed description with respect to a preferred embodiment of the invention, when read in conjunction with the accompanying drawings, in which like parts are designated with like reference numerals.

DETAILED DESCRIPTION OF THE PREFERRED EMBODIMENT

The present invention is essentially concerned with an improvement of the unique and useful apparatus and operating principle as disclosed in the U.S. Pat. No. 4,098,582 issued on July 4, 1978 to the inventor of the present invention, embodied and reduced in practice by way a preferred embodiment thereof, on which description will now be given.

In various practical operations of such chemical reactions as oxidation, reduction, absorption, deodorizing, polymerization and depolymerization, etc., or such physical actions of mixing, cooling, heat exchanging, wetting, foaming, etc., they generally handle a fluid mixture prepared in an appropriate condition to such operations, such as mixture of fluid having an acid or alkaline character of, for instance, a single substance, a mixture and/or a compound or compounds thereof including gas, liquid, fluidized solid, or a mixture thereof under appropriate flow velocity and pressure conditions.

The present invention is essentially directed to the provision of means for attaining the improvement in a mixing and contact action of fluids involved within a fluid passageway system or flow deflecting structure, in which the fluid/fluids is deflected in a spiral or whirling fashion while passing therethrough so as to obtain an idealistic gas-liquid, or gas-gas, or liquid-liquid dispersion state, which is embodied and realized by way of the preferred embodiment of the means as disclosed in the U.S. Pat. No. 4,098,582 issued on July 4, 1978 to the inventor of this invention, and which comprise as a part a flow deflecting structure or passageway in a guide vane form for allowing such fluid/fluids to pass therethrough under an appropriate flow velocity and pressure condition, the flow deflecting structure being provided intermediately between an inlet and an outlet of the fluid to and from the reacting area, whereby the fluid is caused to be deflected physically in such a manner that it flows spirally or whirlingly down and along the inner wall surface of the flow deflecting passageway with an appropriate directively, peripheral velocity, inertia force, and pressure gradient, thus causing the fluid flow to be converted to whirling flows of a concentrically disposed multi-layer, or two or three layer structure according to different physical properties which are specific to individual ingredient or component substances contained in the fluid mixture.

Figure 1:
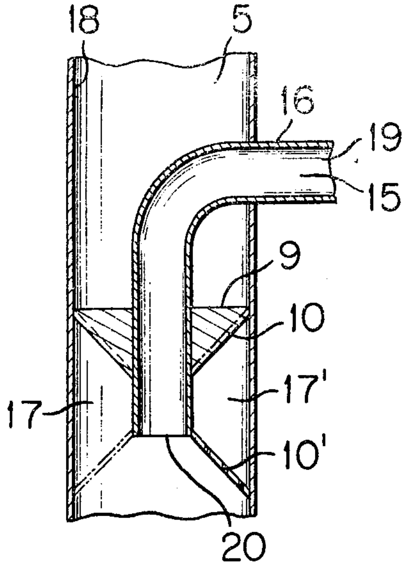
FIG. 1 is a vertical cross-sectional view showing a dynamic jet mixing apparatus according to this invention.
Figure 4:
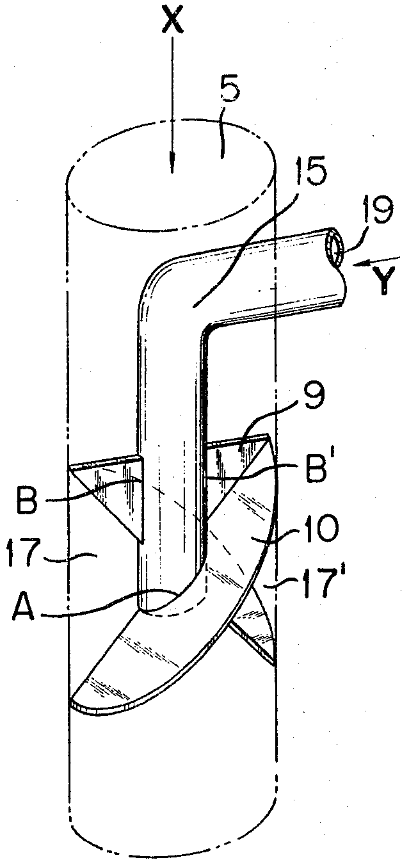
FIG. 4 is a perspective view, partly in section, showing the apparatus of the invention.
Figure 2:
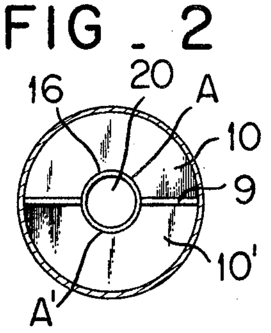
FIG. 2 is a transversal cross-sectional view showing a fluid outlet side of the apparatus shown in FIG. 1.
Figure 3:
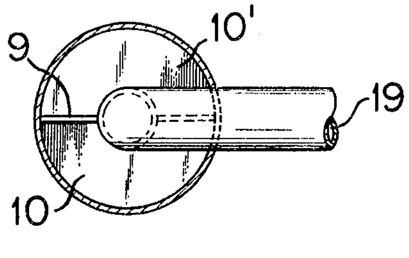
FIG. 3 is a similar cross-sectional view to FIG. 2, yet showing a fluid inlet side of the apparatus shown in FIG. 1.

As best seen in FIG. 4, the flow deflecting structure 7 comprises a partition 9 of a triangle shape and two split panels of halfway-cut elliptic shape 10,10' (hereinafter referred to as split elliptic panels), the partition 9 being of an inverted isosceles or equilateral triangle shape, and disposed with its base side extending diametrally with respect to the reacting pipe 5 and with its apex pointed to meet with the central axis of the reacting pipe 5, from which two sides of the equilateral or isosceles triangular partition 9 defining the apex therebetween, the two split elliptic panels 10,10' extending in opposite directions or at right angles in symmetrical relationship with respect to the central axis of the cylindrical reacting pipe 5. In such general arrangement of the fluid flow deflecting apparatus, according to this invention, there is further provided a fluid introduction pipe member 15 having an outer diameter substantially smaller than the inner diameter of the fluid passageway or reacting pipe 5 and having a straight-through opening therein, and disposed centrally and coaxially with respect to the center of the reacting pipe 5 and extending an appropriate distance or length along the central axis of the reacting pipe. According to this invention, this introduction pipe member 15 is disposed extending longitudinally along the axis of the reacting pipe 5 in such a manner that it extends longitudinally through a cylindrical opened or removed portion as defined centrally of the above mentioned two split elliptic panels 10, 10' at the point where these two split panels meet cross-wise with each other and of the central area of the partition 9 extending in the longitudinal direction along the central axis of the reacting pipe 5, and so that the outer circumferential surface 16 of the introduction pipe member 15 contact and join mergingly with the opened or removed edge portions A, A' and B, B' (FIGS. 2 and 4) of the split elliptic panels 10, 10 and the partition 9, respectively, thus defining a fluid flow deflecting path 17, 17' of a spiral configuration and opened in both upstream and downstream ends to pass the fluid therethrough by the inner wall surface 18 of the reacting pipe 5, the split elliptic panels 10, 10' and the partition 9. The fluid introduction pipe member 15 has a fluid inlet 19 at its end extending in communication with the outside of the fluid passageway or reacting pipe 5 at an appropriate point of introduction in the upstream side of the fluid flow within the passageway system.

In operation, in such arrangement of the self-contained fluid jet-mixing apparatus according to this invention, the fluid X passing through the passageway or deflecting structure 7 as shown in FIG. 4 by an energizing function of a delivery pump or a blower, not shown, is now rectified and fed dividedly into two generally equivalent split flows or currents while passing through the flow deflecting path 17 of the apparatus spirally or whirlingly down and along the inner wall surface of the flow deflecting passageway with an appropriate directivity, peripheral velocity, inertia force and pressure gradient. While passing through the fluid flow deflecting path 17, the fluid X is caused to flow accordingly as guided by the split elliptic panel members 10, 10' along the inner wall surface 18 of the reacting pipe 5 or flow deflecting structure 7 by a positive twisting effect created by a momentum or kinematic energy within the given closed or concentrated configuration of the flow deflecting path 17 and at a substantially accelerated flow rate than the normal flow velocity of the fluid X within the path, which is so created by the specific fluid dynamic function effected by the flow deflecting path, as fully described in the above mentioned U.S. Pat. No. 4,098,582. More specifically, when departing from the flow deflection path 17, the fluid X forms an opening or cavity area of a negative pressure in a generally cylindrical form extending in the longitudinal direction along and around the longitudinal central axis of the flow deflection path 17 at the fluid outlet side in the immediate downstream or in the trace thereof. The extension or dimensions of such opening or cavity is generally determined by a subtraction of the minimum opening cross-sectional area of the flow deflecting passageway or path 17 from effective cross-sectional area of the reacting pipes; the whirling flow rate of the fluid X and the physical properties of the fluid X. When such opening or cavity is formed, the fluid X is now deflected as a spiral or whirling flow in the area of an annulus-like shape around the above mentioned opening or cavity area. With this, a pressure distribution about the fluid outlet 20 of the fluid introduction pipe member 15 now becomes to be negative substantially to the extent that it is generally proportional to squared whirling flow velocity or supply or feed pressure of the fluid X. Thus created negative pressure in the central area of the flow deflecting path 17 functions to cause the fluid Y outside of the passageway system to be withdrawn or introduced thereinto as typically shown by an arrow in FIG. 4 through the fluid introduction pipe member 15. The fluid Y thus-introduced into the passageway system is now entrained as a similar whirling flow following the existing whirling flow of the fluid X within the passageway system, thus carrying substantial and extensive mixing and contact effect with the fluid X along the area around the above mentioned opening or cavity of a negative pressure within the flow deflecting path 17.

Since there is a substantial difference between the relative velocities of the fluids X and Y now in the mixing and contact state, a countless number of turbulence vortexes are formed in the boundary layers of such fluids X and Y, whereby there is attained an extraordinarily marked effect of mixing and contact with aids of such factors as differences in the mass, density and physical properties of the fluids X and Y, as well as the effect of centrifugal and centripetal forces rendered therein.

For more detail of the flow deflecting system, such as concentric layer formation theory of whirling fluid flows within the system while passing therethrough, the relationship between fluid flow velocity, minimum cross-sectional area of the flow deflecting passageway, effective radius of the reacting pipe, angle of inclination of the split elliptic panels, etc., the reference may be made to the U.S. Pat. No. 4,098,582 to the inventor of this invention.

The effect and function attained by this invention by way of the preferred embodiment as fully described herein may be furthered for attaining a higher effect of mixing and contact of a plurality of fluids by such arrangement that the apparatus is disposed in series fashion with the plurality of projections or collision members 8 within the passageway system or flow deflecting path 17 which disclosed in the above mentioned U.S. Pat. No. 4,098,582. In such specific application, such advantageous effect can be expected that the fluid X within the flow deflecting path 17 is assuredly prevented from being discharged backwardly from the fluid inlet 19 of the fluid introduction pipe member 15 by virtue of an advantageous cushioning effect of the above mentioned cavity formed in the trace of the fluid introduction pipe member 15 even in the case that the fluid X is filled up within the fluid passageway or reacting area in the downstream of this particular flow deflecting system, otherwise such discharging or expelling effect occurring due to undesired drag effect caused by load member or members added at the downstream point of the passageway system.

What is claimed is:

1. In a self-contained fluid jet-mixing apparatus for promoting mixing and contact actions between first fluids such as a gas, a liquid, a fluidized solid and/or a mixture thereof in a fluid flow deflecting system including cylindrical fluid passageway means defining a cylindrical fluid path; means for providing said first fluid with appropriate flow velocity and pressure conditions in a given direction within said cylindrical fluid passageway means; fluid flow deflecting means disposed centrally in said fluid passageway means and adapted to cause a flow of said first fluid to be deflected in a spiral or whirling flow state at a predetermined angle of inclination toward downstream of said fluid, thereby to cause said first fluid to be accelerated and distributed at a predetermined flow configuration within said passageway means; said flow deflecting means being guide vane means which comprise a partition member of an inverted triangle shape with at least two equal sides, with the base thereof extending diametrally with respect to said cylindrical passageway means and with the inverted apex pointed in coincidence with the central axis of said cylindrical passageway means, and a set of planar panel members having a generally semi-elliptic shape, each panel member extending at the major axis thereof from one side of said triangle-shaped partition member other than the base thereof in opposite directions toward an inner wall surface of said passageway means and in symmetrical relationship with respect to the central axis of said cylindrical passageway means in such a manner that said semi-elliptic panel members are inclined with each other at the apex angle of said triangle partition member toward downstream of said first fluid flow, and at the outer circumferential edges thereof joining closely with said inner wall surface of said passageway, thereby defining a spiral flow path for said first fluid along said central axis thereof, the improvement which further comprises fluid conduit means having a straight-through opening therein and extending centrally and in the longitudinal direction along said axis of said passageway means, thereby to define a straight-through opening or passageway independent from said fluid passageway means and adapted to allow second fluid or fluids outside of said passageway means to be withdrawn or introduced into said passageway means for admixing the said first fluid under the negative pressure created by said flow deflecting means.

2. The improvement as claimed in claim 1 wherein said fluid conduit means are a length of pipe having an inlet opened outside of said passageway means in the upstream area of said fluid flow and an outlet opened in the central and trailing end of said flow deflecting means, and extending straight-through with said partition member and said set of planar panel members in the center or crossing area thereof from the upstream to the downstream of said fluid flow within said passageway means, and joining or merging integrally or sealingly with adjacent portions of said partition member and said set of planar panel members, thereby to define a fluid flow path of a spiral shape around said conduit means.

3. Fluid jet-mixing apparatus for promoting mixing and contact actions between fluids such as a gas, a liquid, a fluidized solid and/or mixtures thereof comprising:

cylindrical fluid passageway means defining a cylindrical fluid path;

means for passing a first fluid through said cylindrical fluid passageway means;

fluid flow deflecting means disposed in said fluid passageway means for deflecting the first fluid in a spiral or whirling flow state to thereby cause the first fluid to be accelerated within said fluid passageway means, said flow deflecting means including:

a partition member of an inverted triangle shape with at least two equal sides, with the base thereof extending diametrally with respect to said cylindrical fluid passageway means, and with the inverted apex pointed in coincidence with the central axis of said cylindrical passageway means, and a set of planar panel members having a generally semi-elliptic shape, each panel member extending at the major axis thereof from one side of said triangle-shaped partition member other than the base thereof in opposite directions toward an inner wall surface of said passageway means and in symmetrical relationship with respect to the central axis of said cylindrical passageway means in such a manner that said semi-elliptic panel members are inclined with each other at the apex angle of said triangle partition member toward downstream of said first fluid flow, and at the outer circumferential edges thereof joining closely with said inner wall surface of said passageway;

fluid conduit means having a straight-through opening therein and extending centrally and in the longitudinal direction along the axis of said cylindrical fluid passageway means, said fluid conduit means including a length of pipe having an inlet opened outside of said fluid passageway means at the upstream end thereof and an outlet at the downstream end opened in the central and trailing end of said flow deflecting means, said pipe extending straight-through with said partition member and said set of planar panel members in the center or crossing area thereof from the upstream to the downstream thereof thereby to define with said partition member and said set of planar panel members a spiral fluid flow path around said pipe; and means for passing a second fluid into said fluid conduit means for introduction into said cylindrical fluid passageway means for admixing with said first fluid.

4. The apparatus of claim 3 wherein said means for passing the second fluid into said fluid conduit means includes a source of the second fluid at a pressure positive with respect to the pressure in said fluid passageway means resulting from the acceleration of the first fluid.

5. The apparatus of claim 3 wherein said means for passing the second fluid into said fluid conduit means includes a source of the second fluid responsive to the negative pressure created in said fluid passageway means by the acceleration of the first fluid.

* * * * *